J. W. Clark.
Making Metal Screws.
N° 34,240.   Patented Jan. 28, 1862.
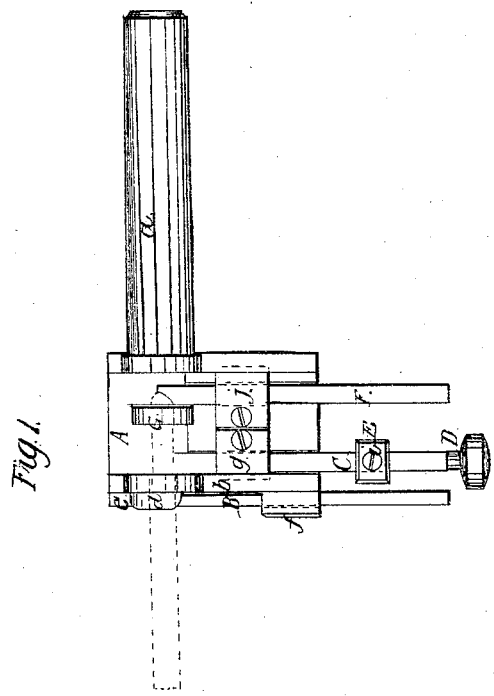
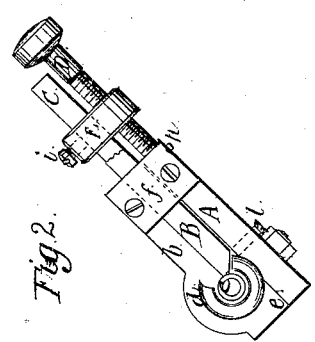
Witnesses:
J. W. Coombs
G. W. Reek
Inventor:
James W. Clark
per Munn & Co
Attorneys

UNITED STATES PATENT OFFICE.

JAMES W. CLARK, OF SPRINGFIELD, MASSACHUSETTS.

IMPROVEMENT IN TOOLS FOR MAKING SCREWS.

Specification forming part of Letters Patent No. 34,240, dated January 28, 1862.

*To all whom it may concern:*

Be it known that I, JAMES W. CLARK, of Springfield, in the county of Hampden and State of Massachusetts, have invented a new and Improved Tool for Making Screws; and I do hereby declare that the following is a full, clear, and exact description of the same, reference being had to the accompanying drawings, forming part of this specification, in which—

Figure 1 represents a plan or top view of my invention. Fig. 2 is a side elevation of the same.

Similar letters of reference in both views indicate corresponding parts.

The object of this invention is to construct a simple and effective tool for making screws from iron, brass, or any other wire; and the invention consists in the arrangement of three cutters fitted into a common stock, which is provided with two guide-openings or rests, one to fit the head and the other the shank of the screw in such a manner that by the action of the first tool the wire is turned down to the size of the head; by the second to the size of the shank, and by the third the point is rounded and the screw completed to receive the thread.

To enable others skilled in the art to make and use my invention, I will proceed to describe it with reference to the drawings.

The stock A of my tool may be made of cast or malleable iron, or any other suitable material, and it is provided with a stem, $a$, that serves to secure the tool in the desired position. In the front plate, $b$, of the stock an opening, $c$, is made to fit to the size of the heads of the screws to be turned, and this opening is furnished with a rim, $d$, projecting beyond the face of said front plate a little more than the thickness of the cutter B, used for turning the screw-heads. This cutter rests on a shoulder, $e$, on the face of the plate $b$, and it is retained by a staple, $f$, as clearly shown in Fig. 2 of the drawings. Its point passes through an open section in the rim $d$ just far enough toward the center of the opening $c$ to cut the wire down to the size of said opening. As soon as the point of the cutter touches the wire, and while the action of said cutter lasts, the rim $d$ and the opening $c$ form a sort of a steady-rest to prevent the wire bending through the action of the first cutter, B, and of the second cutter, C.

The second cutter, C, serves to form the shank of the screw, and it is situated close at the inside of the front plate, $b$, of the stock. It is guided by a groove in the bottom plate of the stock, and held down by the top plate, $g$, and it is moved backward and forward by means of a screw, D, which passes through an adjustable sleeve, E, and the end of which is secured in the body of the stock by means of a pin, $h$, in such a manner that said screw can be turned round freely without being permitted to move in a longitudinal direction.

The sleeve E is secured to the cutter by a set-screw, $i$, which allows of moving it (the sleeve) on the cutter in a longitudinal direction, so that its position can be adjusted as the length of the cutter diminishes, and so that it can be secured to different cutters.

The cutter C acts on the wire as soon as the same leaves the opening $c$ in the front plate, $b$, and the close proximity of the point of the cutter to said front plate, and consequently to the edge of said opening, renders it feasible to take a pretty heavy cut without bending the wire, so that for ordinary screws one cut will suffice to reduce the wire from the size of the head to that of the shank.

The last or third cutter, F, serves to round the points of the screws. This cutter is inserted into a groove in the bottom plate of the stock, and it is held down by a top plate, $j$, similar to the second cutter, C. The point of this cutter is rounded to correspond to the rounded ends of the screws, and it operates upon the ends of the screws in close proximity to the guide-plate or rest G. This guide-plate is firmly inserted into the bottom plate of the stock, being secured to the same by means of a nut, $k$, so that it can be removed at pleasure. For screws of ordinary length it remains in its place; but if screws of extraordinary length are to be made said guide-plate, together with the third cutter, F, are taken out and the shank of the screw passes along into a hole in the stem of the stock.

The cutters C and F are made adjustable by set-screws $l$, which pass up through the bottom of the stock, and a similar set-screw may be applied to the first cutter, B. By these means the points of the cutters are set higher or lower, according to the material from which the screws are made.

This tool may be used on any ordinary lathe, and when in working position it is held by the round stem at an angle of about forty-five degrees, so that the chips will readily fall away from the cutters, and do not cause any trouble or interruption in the work.

Having thus fully described my invention, what I claim as new, and desire to secure by Letters Patent, is—

The arrangement of the cutters B C F, opening c, segmental rim d, and movable guide-plate G, in combination with the stock A, as and for the purpose described.

JAMES W. CLARK.

Witnesses:
  DUDLEY T. CHASE,
  WM. DICKINSON.